US011385612B2

(12) United States Patent
Nimmer

(10) Patent No.: US 11,385,612 B2
(45) Date of Patent: Jul. 12, 2022

(54) SYSTEM AND METHOD FOR DIGITAL MOTOR IDENTIFICATION AND CONTROL

(71) Applicant: Metropolitan Industries, Inc., Romeoville, IL (US)

(72) Inventor: James Andrew Nimmer, Minooka, IL (US)

(73) Assignee: METROPOLITAN INDUSTRIES, INC., Romeoville, IL (US)

( * ) Notice: Subject to any disclaimer, the term of this patent is extended or adjusted under 35 U.S.C. 154(b) by 30 days.

(21) Appl. No.: 16/044,158

(22) Filed: Jul. 24, 2018

(65) Prior Publication Data
US 2019/0033813 A1 Jan. 31, 2019

Related U.S. Application Data

(60) Provisional application No. 62/537,122, filed on Jul. 26, 2017.

(51) Int. Cl.
G05B 19/042 (2006.01)

(52) U.S. Cl.
CPC .. *G05B 19/0426* (2013.01); *G05B 2219/2228* (2013.01); *G05B 2219/2231* (2013.01)

(58) Field of Classification Search
CPC ........ G05B 19/0426; G05B 2219/2228; G05B 2219/2231
See application file for complete search history.

(56) References Cited

U.S. PATENT DOCUMENTS

| 4,773,005 | A | * | 9/1988 | Sullivan | G06F 12/0661 710/9 |
| 4,972,184 | A | * | 11/1990 | Go | G06F 13/22 370/449 |
| 5,295,059 | A | * | 3/1994 | Brooks | G05B 19/05 700/18 |
| 6,189,059 | B1 | * | 2/2001 | Sotek | G06F 12/0661 710/10 |
| 6,577,231 | B2 | * | 6/2003 | Litwin, Jr. | G04G 7/00 340/12.39 |
| 6,653,810 | B2 | * | 11/2003 | Lo | G05B 19/18 318/111 |

(Continued)

FOREIGN PATENT DOCUMENTS

KR 20140132187 A * 11/2014

*Primary Examiner* — Michelle T Bechtold
*Assistant Examiner* — Vi N Tran
(74) *Attorney, Agent, or Firm* — Levenfeld Pearlstein, LLC

(57) ABSTRACT

Systems and methods for setting up and operating a motor control system are provided. Such systems and methods can include a parent device that includes a digital library of control commands and a child device. A child device can transmit a unique identification code to the parent device and the parent device can identify, from the digital library, a group of control commands specific to the child device using the unique identification code, generate an address for the child device, and transmit a copy of the address to the child device for storage thereon. The parent device can transmit a control signal that includes the address and one of the control commands from the first group to the child device and, responsive thereto, the child device can perform an action when the address matches the copy of the address stored on the child device.

20 Claims, 4 Drawing Sheets

(56) References Cited

U.S. PATENT DOCUMENTS

| | | | | |
|---|---|---|---|---|
| 2001/0034557 | A1* | 10/2001 | Hudson | G05B 19/0421 |
| | | | | 700/3 |
| 2010/0306431 | A1* | 12/2010 | Adkins | G06F 13/4291 |
| | | | | 710/110 |
| 2015/0227204 | A1* | 8/2015 | Gipson | G06F 3/016 |
| | | | | 345/156 |
| 2015/0339253 | A1* | 11/2015 | Chen | G06F 13/364 |
| | | | | 710/110 |
| 2016/0062930 | A1* | 3/2016 | Kijima | G06F 13/364 |
| | | | | 710/110 |
| 2016/0277182 | A1* | 9/2016 | Suzuki | H04L 9/3226 |
| 2017/0180305 | A1* | 6/2017 | Seine | H04L 61/2023 |

* cited by examiner

SYSTEM AND METHOD FOR DIGITAL MOTOR IDENTIFICATION AND CONTROL

CROSS REFERENCE TO RELATED APPLICATIONS

The present application claims priority from and the benefit of U.S. Provisional Patent Application No. 62/537,122 filed Jul. 26, 2017 entitled "System and Method for Digital Motor Identification and Control" which is hereby incorporated herein by reference in its entirety.

FIELD

Embodiments of the subject invention are generally directed to a motor control system, and more particularly to systems and methods utilizing digital motor identification (DMID) for recognizing, programming and controlling electric motors.

BACKGROUND

It is generally known that a conventional control system for electric motors can typically require an extensive amount of time and familiarity the system to configure and complete the initial set-up process. This is especially the case where the system features multiple motors and a complex connection network. For example, in such conventional systems motor parameters usually need to be manually entered into each drive and control applications need to be programmed into a programmable logic controller (PLC) before the system can operate as intended. Such a process can be extremely time consuming and/or expensive. In addition, changes to motor operations or parameters can also be costly and time consuming to implement.

DETAILED DESCRIPTION

Figure 1:
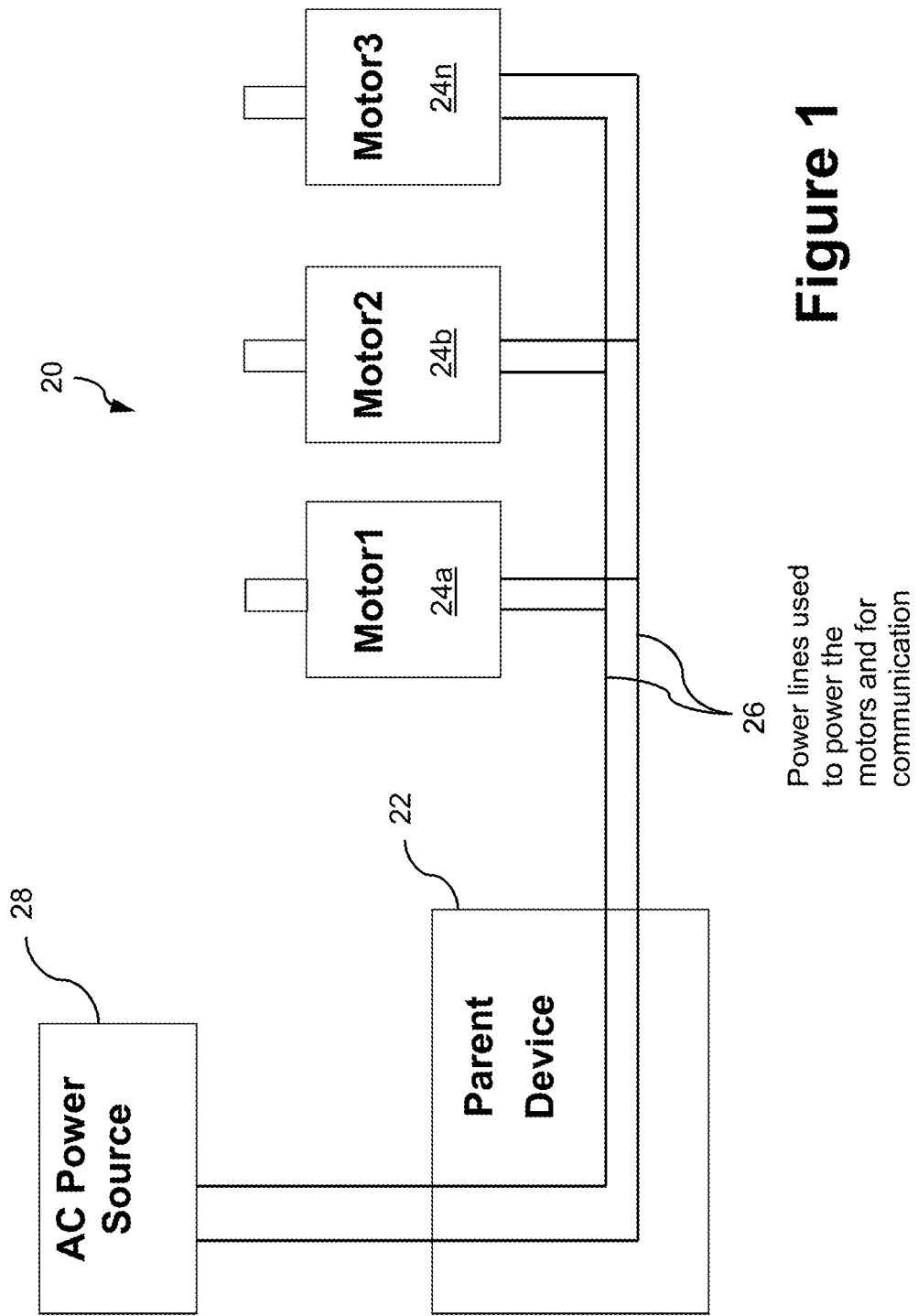
FIG. 1 is a block diagram of a system in accordance with disclosed embodiments.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments presented herein are directed to systems and methods for automatically setting up a motor control system requiring little to no user interaction. In some embodiments, digital motor identification (DMID) can be featured. DMID, according to embodiments presented herein, can be implemented in connection with the motor control system to provide the automatic set-up process. Motors can be automatically recognized, parameters can be automatically loaded, and applications can be automatically set-up once power is initially provided to the system.

The systems and methods described herein for setting up and operating the motor control system can include a parent device that includes a digital library of control commands and one or more child device(s) that communicate with the parent device. When the child device powers on, the child device can determine that the child device has not been assigned a respective address, and can transmits a unique identification code to the parent device. Responsive to receiving the unique identification code, the parent device can identify, from the digital library, a group of the control commands specific to the child device using the unique identification code, generate the respective address for the child device, and transmit a copy of the respective address to the child device for storage thereon. The parent device can further transmit to the child device a first control signal that includes the respective address and a control command from the first group. The child device can receive the control signal and, responsive thereto, perform an action indicated by the control command from the group when the respective address matches the copy of the respective address stored on the child device. According to embodiments presented herein, the parent device can further select the one of the control commands from the group by detecting a condition associated with execution of the control command.

FIG. 1 is a block diagram of a system 20 in accordance with disclosed embodiments. As seen in FIG. 1, the system 20 can include a master controller or parent device 22, at least one child device 24*a* . . . *n*, a power source 28, and a communication bus 26. In some embodiments, a child device 24*a* . . . *n* can include an electric motor. According to embodiments presented herein, the communication bus 26 can include standard power line connections used to transmit signals between a child device 24*a* . . . *n* and the parent device 22 and provide power to the child device 24*a* . . . *n* from the power source 28. The parent device 22 can also be configured to communicate with multiple motors and run multiple applications simultaneously. The parent device 22 can include a processor and a memory device that stores a digital library of control commands.

As shown schematically in FIG. 1, according to embodiments set forth herein, the system 20 can include a plurality of child devices 24*a* . . . n electrically/electronically coupled to the parent device 22 via a shared communication bus 26. According to such embodiments, the connection 26 between the parent device 22 and multiple child devices 24*a* . . . n can carry both electricity (from power source 28 and through parent device 22) to power the motors of the child devices 24*a* . . . n and control signals for electronic communication between parent device 22 and child devices 24*a* . . . n. For example, . . . where the parent device 22 detects a condition which requires operation of only a single child device (e.g. 24*a* and "motor1"), the parent device 22 can transmit a control signal with an address for "motor1" followed by a command for motor1 to start (e.g. "motor1, start" represents a simplified version of the data transmitted by the parent device). Upon receipt of such data, motor1 of child device 24*a* can start and send back an acknowledgement to the parent device 22. Since the motors of child devices 24*a* . . . *n* can, according to embodiments presented herein, share the same power lines, other child devices 24*b* . . . *n* (e.g. "motor2" and "motor3") coupled to parent device 22 can also receive the same command transmitted from the parent device 22, however because the command was preceded (or accompanied) by the specific address associated with motor1, the command will be ineffective with regard to "motor2" and "motor3".

Figure 2:
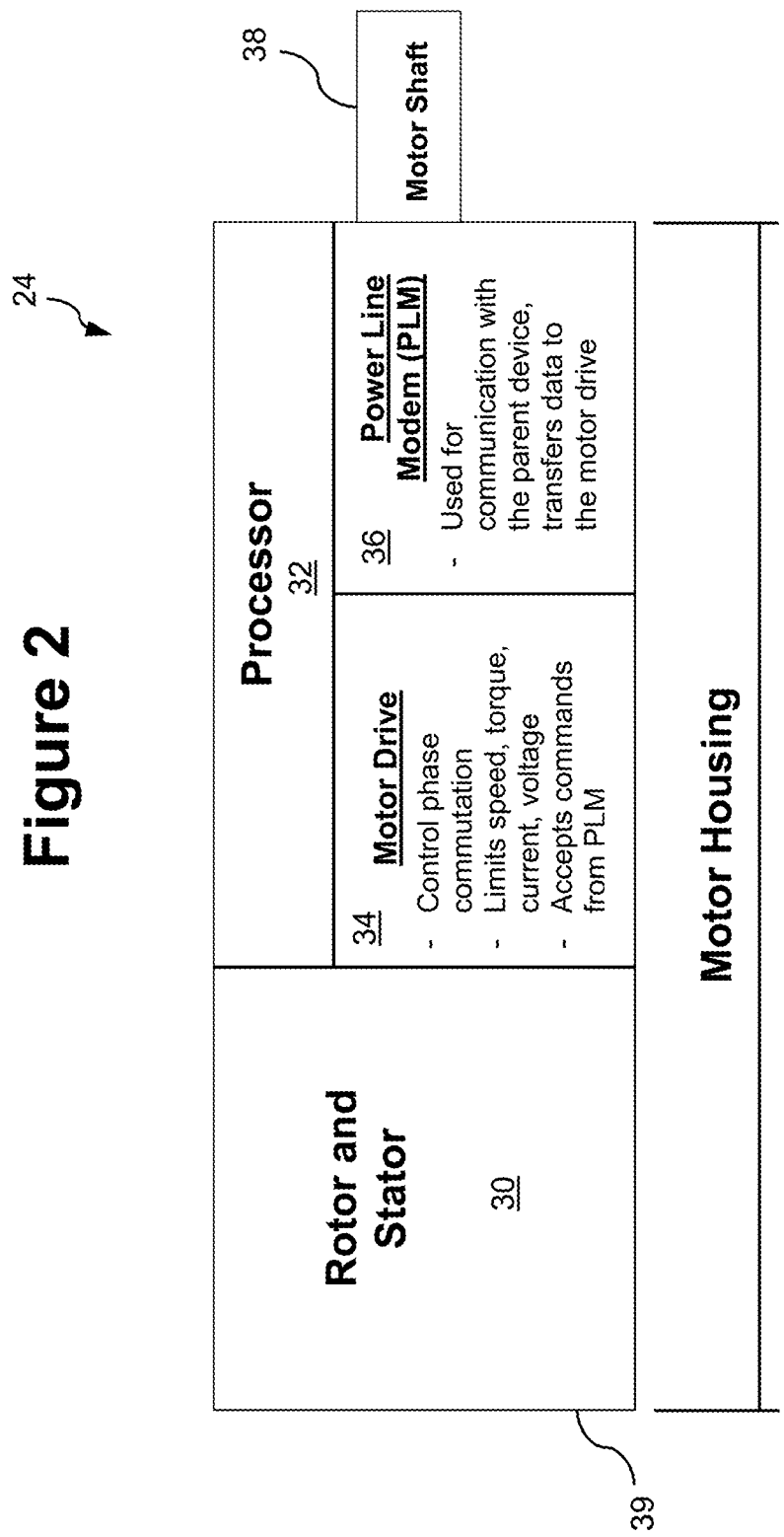
FIG. 2 is a schematic view of a child device in accordance with disclosed embodiments.

According to embodiments presented herein, the child device(s) 24a . . . n can include a DMID-enabled electric motor. FIG. 2 is a schematic view illustrating the components of an exemplary motor 24 according to embodiments presented herein. As shown schematically in FIG. 2, the motor 24 can comprise a physical electric motor with a rotor and stator 30, and can feature an integrated motor drive 34 with a power line modem or "PLM" 36. As is generally known, a PLM is a device that uses AC power lines to simultaneously transfer data and provide electrical power. As shown schematically in FIG. 2, the motor drive 34 and PLM 36 can both be controlled by a programmable processor 32. The processor 32 can include control circuitry and be configured with main computer memory, such as for example random access memory, dedicated to a unique identification or DMID code, and an "address" assigned by the parent device 22. Additional or auxiliary memory can be dedicated to communication via the PLM 36.

The address may be assigned and written to the memory upon the initial set-up of the system 20 and be programmed as read-only thereafter. According to exemplary embodiments, the DMID code may be read-only and include identifying information representative of the type of motor and application of use. The DMID code can further be formatted according to the ASCII character set. For example, according to embodiments disclosed herein, "20035WP" can denote a 2HP 3500 rpm well pump motor, with "20035WP" being represented in ASCII decimal values as: 50 48 48 51 53 87 80.

According to exemplary embodiments, the digital library of control commands stored in the memory of the parent device 22 can feature preprogrammed blocks of data corresponding to certain types of motors. For example, data which is specific to a motor type such as phase inductance, phase resistance, BEMF (back electromotive force), horsepower, torque/speed ratios, limits, etc. can be stored within a consecutive digital block. Such preprogrammed blocks of data can be beneficial to keep data transfer between the motor and parent device to a minimum. The digital library can contain blocks of data for several different types of motors.

According to embodiments presented herein, the control commands can relate to different motor applications. Such commands can be unique from one application to another. For example, a well pump application may contain functions to read pressure sensors and flow meters, while a sump pump application may contain functions to read level sensors. The application commands according to embodiments disclosed herein may also include settings such as, for example, 'on' and 'off' levels for sump pumps, and pressure and flow settings for well pumps.

As described further below, the specific blocks of code accessed in the parent device's 22 library may depend on the specific DMID code received from the child device 24a . . . n during the initial set-up. In addition, multiple different applications commanding multiple child devices 24a . . . n can be used at one time.

Figure 3:
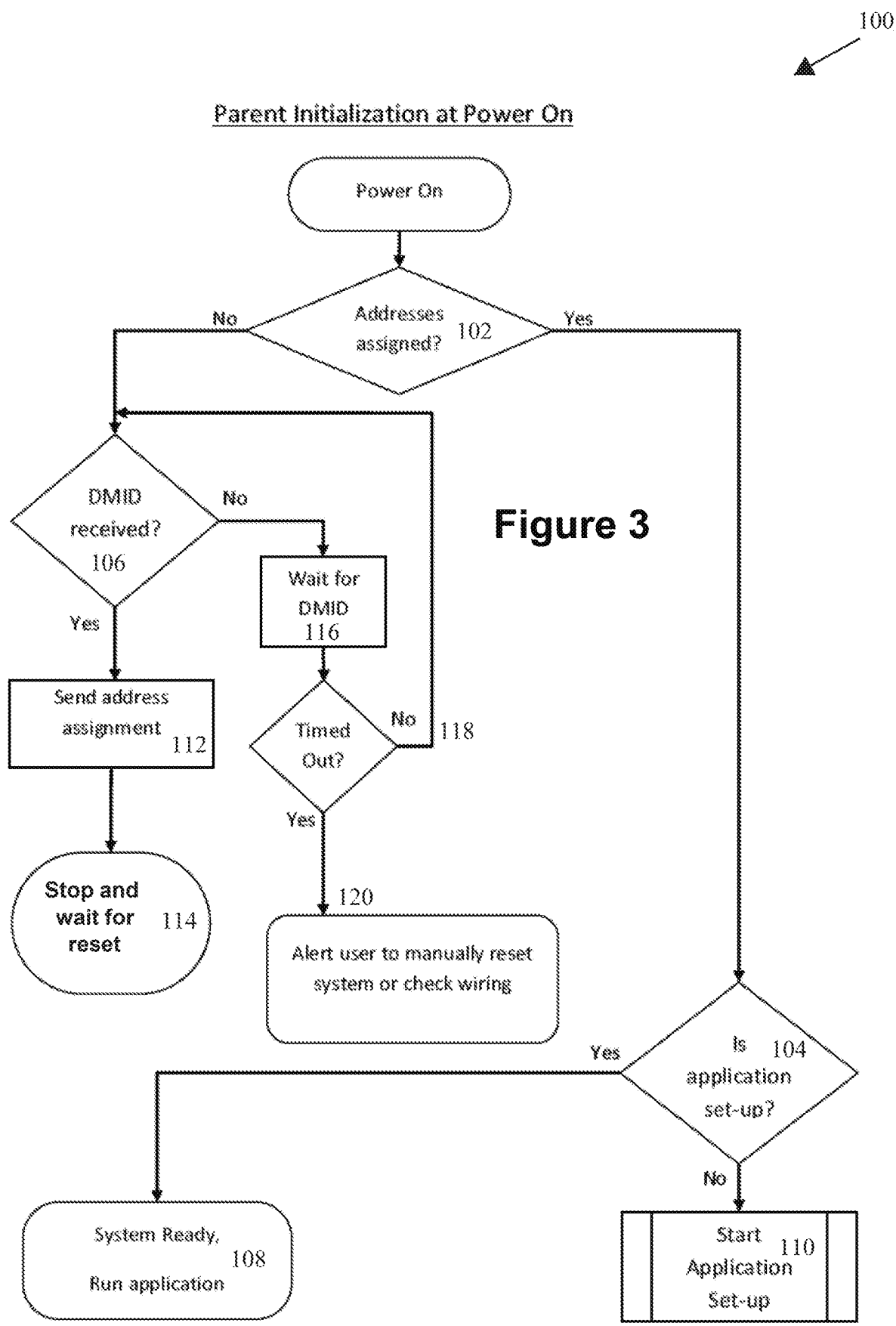
FIG. 3 is a flow diagram of a method in accordance with disclosed embodiments.

According to embodiments presented herein, initial set-up can occur automatically when the system 20 is first powered on. FIG. 3 is a flow diagram of a method 100 in accordance with disclosed embodiments. As seen in FIG. 3 when the parent device 22 is powered on it can first determine whether addresses have been assigned or generated, as in 102. When addresses have been generated for child devices 24a . . . n, the parent device 22 can determine whether a control application has been set up, as in 104. The parent device 22 can run the application if it is set-up, as in 108, and start an application set up process if it is not set-up, as in 110.

As seen in FIG. 3 when all the addresses have not been generated, the parent device 24 can determine whether a DMID has been received by one of the child devices 24. When no DMID has been received, the parent device 22 can wait for the DMID, as in 116 and 118, and can alert a user to manually reset the system 20 and/or check the wiring of the communication bus 26 when a time out condition is reached, as in 120. After the DMID is received, the parent device 22 can generate and transmit the address (e.g. "motor1") to the associated child device 24a, as in 114.

Figure 4:
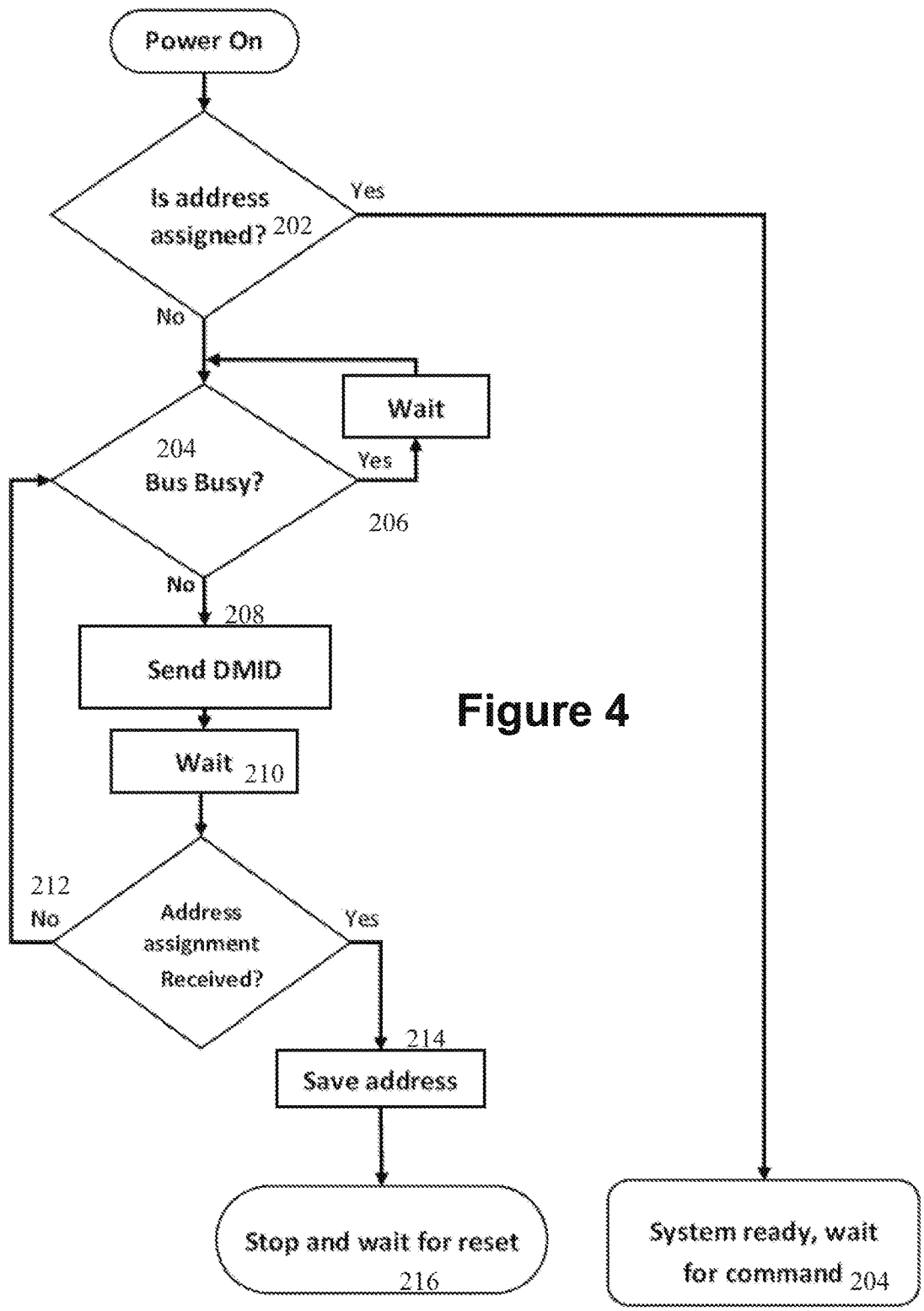
FIG. 4 is a flow diagram of a method in accordance with disclosed embodiments.

FIG. 4 is a flow diagram of a method 200 in accordance with disclosed embodiments. As seen in FIG. 4, when a child device 24 is powered on it can first determine whether an address has been assigned, as in 202. When an address has been assigned, the child device 24 can wait for a command, as in 204. When no address has been assigned, the child device can determine whether the communication bus 26 is busy, as in 204. If the communication bus 26 is busy, the child device 24 can wait, as in 206. Otherwise, the child device 24 can send the DMID to the parent device 22, as in 208, and wait to determine whether an address assignment is received, as in 210. When no address assignment is received, the child device 24 can return to assessing whether the communication bus 26 is busy, as in 212, and when the address is received, the child device 24 can save the address or a copy thereof and wait for a reset, as in 214 and 216.

As an exemplary operation according to the embodiments described above, the parent device 22 can recognize that "motor1" of child device 24a is a "2 horsepower well pump motor". The parent device 22 can use the DMID to access electronic code (computer-readable instructions) from its embedded digital "library" and send commands to the child device 24a according to the application code; in this example, a well pump application. According to embodiments described herein, when the parent device 22 detects the existence of a condition which requires "motor1" of child device 24a to execute a particular basic command or requires data regarding a motor condition, the parent device 22 can transmit a control signal which includes the specific motor address and a corresponding command for the child device 24a. In response to the control signal, the child device 24a can send back a response signal to the parent device 22. The response signal can include acknowledgements, failure notifications, and/or status data for the child device 24a. According to embodiments presented herein, examples of commands that the parent device can transmit to a motor and corresponding responses transmitted back from the motor to the parent can include:

Basic Commands

| Command from parent | Response from motor: |
|---|---|
| Start | Start acknowledged |
| Stop | Stop acknowledged |
| Set RPM to "RPM value" | RPM set to "RPM value" |

Measurement Commands

| Command from parent | Response from motor: |
|---|---|
| Measure RPM | running RPM value |
| Measure Current | running current value |
| Measure Voltage | running voltage value |

-continued

| Command from parent | Response from motor: |
|---|---|

According to some embodiments, the motor processor 32 in conjunction with the motor drive 34 can retain control over such things as motor commutation, torque limits, speed limits, etc.; which can be controlled by programmable code stored in the motor's processor (instructions stored on a computer-readable medium).

As described above, according to exemplary embodiments, the system 20 can be configured such that all electronic communication between the parent device 22 and the child device(s) 24a . . . n can takes place over the system's electrical lines/connections via the PLM(s) 36. According to exemplary embodiments, the DMID bus or communication protocol can feature transmission of data packets having 8 bytes (each data byte including 8 bits—i.e. 64 bits total). Such data packets can include a 1 byte checksum. As is generally know, a checksum can be utilized to check if data contains errors. Thus, in the protocol implemented herein, the checksum byte can be the 8th byte of the packet; generated by adding bytes 1-7 together and reading the first 8 bits of the sum. For example, during initial set-up of the system, a motor 24a . . . n can send its 7-byte DMID code followed by a checksum byte at timed intervals until the parent device responds with an address assignment.

The following example illustrates the generation of a checksum from the ASCII-formatted DMID code "20035WP" referenced above.

| | Byte: | | | | | | |
|---|---|---|---|---|---|---|---|
| | 1st | 2nd | 3rd | 4th | 5th | 6th | 7th |
| ASCII characters: | 2 | 0 | 0 | 3 | 5 | W | P |
| Decimal Values: | 50 | 48 | 48 | 51 | 53 | 87 | 80 |

In this example, the sum of bytes 1-7 equals 417 or 0000 0001 1010 0001 in binary. Keeping in mind only the first 8 bits are read; the checksum equals 1010 0001 in binary or 161. Thus, when the motor sends the example DMID to the parent device, the 8 bytes of data sent are:

| | Byte: | | | | | | | |
|---|---|---|---|---|---|---|---|---|
| | 1st | 2nd | 3rd | 4th | 5th | 6th | 7th | 8th |
| Value: | 50 | 48 | 48 | 51 | 53 | 87 | 80 | 161 |

With every packet of data sent, the 8th byte can be the checksum byte according to preferred embodiments. Thus, when either device receives a packet of data, bytes 1-7 are used to generate a new checksum. The new checksum is then compared with the received checksum to verify the validity of the data. If the data is invalid, the data is discarded, and the transmitting device is notified to resend the last packet of data.

After the parent device 22 has assigned every child device 24a . . . n in the system 20 an address, the parent device 22 can be configured to notify a user that the system needs to be reset by cycling the power to the system. Once the process is complete, the parent device 22 can send commands and the child device(s) 24a . . . n can send back acknowledgements of commands (or failure notifications) and status data/measurements as described herein. According to exemplary embodiments, the order in which data is sent and received can be as follows:

Data Packet Contents:

| 1st byte | 2nd-7th bytes | 8th byte |
|---|---|---|
| Address | Command/Data | Checksum |

According to embodiments presented herein, each byte transferred in the DMID bus protocol can use a UART (Universal Asynchronous Receiver Transmitter) style data transfer method, using start/stop conditions to frame the byte.

Embodiments disclosed represent an advancement over existing systems and embody several key differences from existing technologies. Such differences include the data structure that the devices recognize, the automatic addressing function, and the automatic motor/application set-up. Each of these features contribute to the uniqueness of the control system and method presented herein.

Although a few embodiments have been described in detail above, other modifications are possible. For example, the steps described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A system comprising:
a parent device that includes a digital library of control commands; and
a first child device that communicates with the parent device;
the first child device further comprises a first memory,
wherein, responsive to the first child device powering on and the first child device first determining that the first child device has not been assigned a first respective address, the first child device transmits a first unique identification code to the parent device,
wherein, responsive to receiving the first unique identification code, the parent device, identifies, from the digital library, a first group of the control commands specific to the first child device using the first unique identification code, generates the first respective address for the first child device, and transmits a copy of the first respective address to the first child device for storage thereon, the copy of the first respective address generated by the parent device being saved by the first child device on the first memory, said copy being transmitted to the first child device without being accompanied by one of the control commands,
wherein, after the first respective address has been saved by the first child device on the first memory, the first memory is configured as read-only thereafter, wherein the parent device transmits a first control signal that includes the first respective address and one of the control commands from the first group to the first child device, and wherein the first child device receives the first control signal and, responsive thereto, performs a first action indicated by the one of the control commands from the first group when the first respective address of the first control signal matches the copy of the first respective address stored on the first child device.

2. The system of claim 1 wherein the parent device selects the one of the control commands from the first group by detecting a condition associated with execution of the one of the control commands from the first group.

3. The system of claim 1 wherein the first child device communicates with the parent device over a standard powerline connection.

4. The system of claim 1 wherein the one of the control commands from the first group includes a basic command.

5. The system of claim 1 wherein the one of the control commands from the first group includes a measurement command.

6. The system of claim 1 wherein the first child device sends a response signal to the parent device after executing the first action.

7. The system of claim 6 wherein the response signal includes an acknowledgment of execution of the one of the control commands from the first group.

8. The system of claim 6 wherein the response signal includes a measurement value of an operational parameter of the first child device.

9. The system of claim 1 wherein the first child device is an electric motor having a processor, a motor drive, and a power line modem,
wherein the power line modem facilitates the communication with the parent device,
wherein the motor drive controls operational parameters of the electric motor, and
wherein the processor controls the motor drive and the power line modem to receive and execute the one of the control commands from the first group.

10. The system of claim 1 wherein the first group of the control commands is a consecutive block of instructions stored in a second memory of the parent device.

11. The system of claim 1 further comprising a second child device including a third memory,
wherein, responsive to the second child device powering on and the second child device determining that the second child device has not been assigned a second respective address, the second child device transmits a second unique identification code to the parent device,
wherein, responsive to receiving the second unique identification code, the parent device, identifies, from the digital library, a second group of the control commands specific to the second child device using the second unique identification code, generates the second respective address for the second child device, and transmits a copy of the second respective address to the second child device for storage thereon, the copy of the second respective address generated by the parent device being saved by the second child device on the third memory, said copy being transmitted to the second child device without being accompanied by one of the control commands,
wherein, after the second respective address has been saved by the second child device on the third memory, the third memory is configured as read-only thereafter, wherein the parent device transmits a second control signal that includes the second respective address and one of the control commands from the second group to the second child device, and wherein the second child device receives the second control signal and, responsive thereto, performs a second action indicated by the one of the control commands from the second group when the second respective address matches the copy of the second respective address stored on the second child device.

12. The system of claim 11 wherein the first child device is a first type of device and the second child device is a second type of device,
wherein, when the first type of device is equivalent to the second type of device, the first group is equivalent to the second group and the first action is equivalent to the second action, and
wherein, when the first type of device is different from the second type of device, the first group is different from the second group and the first action is different from the second action.

13. A method comprising:
responsive to a child device powering on, the child device first determining that the child device has not been assigned a respective address;
responsive to the child device determining that the child device has not been assigned the respective address, the child device transmitting a unique identification code to a parent device;
responsive to receiving the unique identification code, the parent device identifying, from a digital library, a group of control commands specific to the child device using the unique identification code, generating the respective address for the child device, and transmitting a copy of the respective address to the child device for storage thereon, said transmission being sent without an accompanying one of the control commands;
saving the copy of the respective address generated by the parent device at a memory of the child device;
programming the memory of the child device as read-only after the copy of the respective address has been saved on the memory;
the parent device transmitting a control signal that includes the respective address and one of the control commands from the group to the child device; and
the first child device receiving the control signal and, responsive thereto, performing an action indicated by the one of the control commands from the group when the respective address matches the copy of the respective address stored on the child device.

14. The method of claim 13 further comprising the parent device selecting the one of the control commands from the group by detecting a condition associated with execution of the one of the control commands from the group.

15. The method of claim 13 wherein the first child device communicates with the parent device over a standard powerline connection.

16. The method of claim 13 further comprising the child device sending a response signal to the parent device after executing the action.

17. The method of claim 16 wherein the response signal includes an acknowledgment of execution of the one of the control commands from the group.

18. The method of claim 16 wherein the response signal includes a measurement value of an operational parameter of the child device.

19. The method of claim 13 wherein the first child device is an electric motor having a processor, a motor drive, and a power line modem,
   wherein the power line modem facilitates the communication with the parent device,
   wherein the motor drive controls operational parameters of the electric motor, and
   wherein the processor controls the motor drive and the power line modem to receive and execute the one of the control commands from the group.

20. A control device comprising:
   a first memory storing a digital library of control commands; and
   a processor,
   wherein the processor receives a unique identification code from a child device that has first determined that it has not been assigned an address after powering on, identifies, from the digital library, a group of the control commands specific to the child device using the unique identification code, generates the address for the child device, and transmits a copy of the address to the child device, the copy of the address generated by the parent device being saved by the child device on a second memory, said copy being transmitted to the child device without being accompanied by one of the control commands,
   wherein the processor is configured to program the second memory as read-only after the copy of the address has been saved by the child device on the second memory, and
   wherein, when the processor detects a condition associated with execution of one of the control commands from the group, the processor transmits a signal that includes the one of the control commands from the group and the address to the child device.

* * * * *